M. E. SMILIE & W. COOLEY.
Improvement in Clothes-Wringers.
No. 126,584.  Patented May 7, 1872.
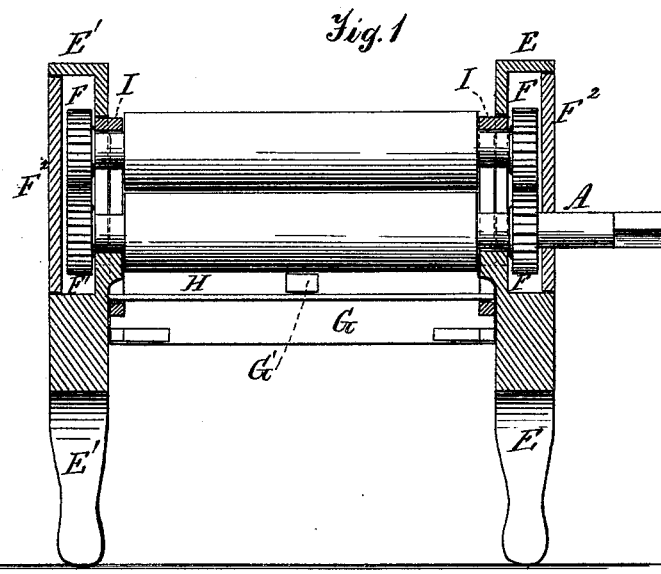
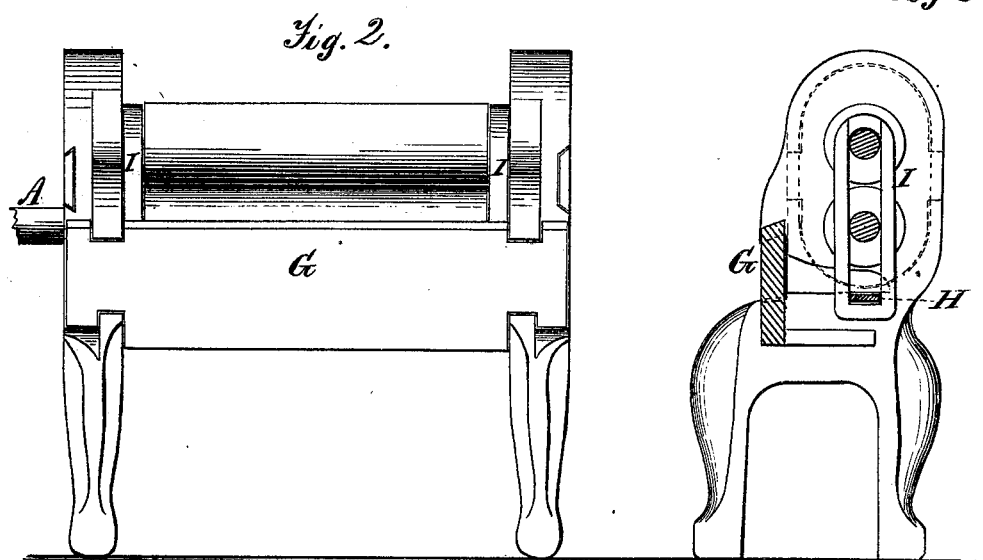
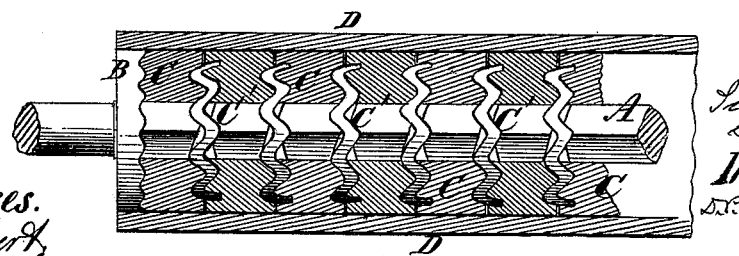

126,584

UNITED STATES PATENT OFFICE.

MELVILLE E. SMILIE AND WILLIAM COOLEY, OF WATERBURY, VERMONT.

IMPROVEMENT IN CLOTHES-WRINGERS.

Specification forming part of Letters Patent No. 126,584, dated May 7, 1872.

Specification describing a certain Improvement in Clothes-Wringers, invented by MELVILLE E. SMILIE and WILLIAM COOLEY, residing at Waterbury, in the county of Washington and State of Vermont.

This invention relates to that class of devices which are used for wringing clothes, or for pressing the water therefrom; and it consists, first, in a novel construction of rollers for such machines; and, secondly, in certain combinations and arrangements of the parts of which it is composed, as will be more clearly set forth hereinafter.

Figure 1 is a central sectional elevation of our improved wringer, showing the ends of the frame, with their recesses for the reception of the gearing, the geared rolls, the bar or tie which unites the end pieces, and the spring which compresses the rollers. Fig. 2 is a side view, showing the cavities in the ends of the frame for holding the caps which cover the cavities or recesses in which the gear-wheels are placed, the bar which unites the end pieces of the frame, and the rollers. Fig. 3 is an end view, showing the recess for the gear-wheels, the rollers, the link which, in conjunction with a similar one upon the other end, causes the upper roller to be pressed upon the lower one. Fig. 4 is a sectional elevation of our improved roller, showing the parts of which it is composed.

Corresponding letters refer to corresponding parts in all the figures.

In constructing rollers for wringing-machines and for analogous purposes we use a shaft, A, the central portion of which is square, it being rounded at its ends to form journals for it to rotate upon. Upon the square portion of this shaft there is placed a collar, B, which is smooth upon its outer surface, but which is corrugated upon its inner surface. Next to this collar or flange there is placed a disk, C, of rubber or gutta-percha, of considerable thickness, it being of such a diameter that, when compressed, its outer surface will be flush with the periphery of the flange or collar. Upon the inside of the rubber disk there is placed a thin disk, C', of metal, corrugated upon both of its sides, as shown in Fig. 4. This disk C' is to be of considerably less diameter than that of the end disk B, or of the rubber C, in order that, when a sufficient number of alternate disks of rubber, C, and of metal, C', have been placed upon the shaft and another end disk put upon its opposite end, the whole may be so compressed as to cause the rubber disks C to meet or come in contact outside of the metal disks, and thus form a smooth surface for the reception of a rubber tube or casing, D, which is to be vulcanized thereon; the whole forming a roller which is firmly secured to its shaft, and is effectually prevented from turning thereon.

The frame-work of our machine consists of two end pieces, E and E', and a bar, G, the lower ends of which end pieces are bifurcated to allow them to be attached to the vessel upon which the machine is to be used, either by means of set-screws passing through one of the arms, or by wedges driven in between the arms of the frame and the sides of the tub. In the outer surface of the upper portion of these end pieces there is formed a recess, in which the gear-wheels F F$^1$, which connect the rolls together, are placed. These recesses are covered by plates F$^2$ F$^2$, so that when in use none of the clothing can be caught in the gearing and torn or soiled thereby. These end pieces of the frame are united together and held at the required distance from each other by a longitudinal bar, G, which is fitted into recesses formed upon one side of said end pieces, as shown in Fig. 2. Upon the inside of this bar G there is a projection, G', which projects inward and under the rolls, so that a spring, H, may rest upon its under surface. This spring serves the purpose of keeping the rolls in contact with each other when not pressed apart by clothes passing between them, and, when in use, of regulating the pressure to be put upon the clothes. The first of these functions is produced by pressing the bar G firmly into the recesses in the ends E E' of the frame, and the latter by having its outer ends rest in the lower ends of the links I I, the upper ends of which form bearings for the journals of the upper roller to rotate in. Another and a very important function which is performed by this spring, and which is due to its arrangement is that, in consequence of its resting upon the support G' at its center, and its ends resting in the links which control the position of the ends of the upper roller, one end of such roller is permitted to rise higher than the other in the event of a thicker body of clothing passing under one end than under the other; which function is important from the fact that the lower roller has its bearings in the ends of the frame, and consequently its position cannot be changed to correspond with that of the upper roller.

One of the rolls of this machine has its shaft extending through the frame, its outer end being prepared for the reception of a crank with which to rotate the rollers, which may have gear-wheels F F' upon both of their ends, as shown; or one pair of these wheels may be dispensed with, if preferred.

What we claim as our invention, and desire to secure by Letters Patent, is—

1. A roller for washing-machines, consisting of a shaft, A, disks of metal B and C', and disks or rings of rubber or gutta-percha, the parts being constructed and arranged substantially as and for the purpose set forth.

2. The recesses in the end pieces of the frame for the reception of the gear-wheels, as and for the purpose set forth.

3. The combination of the recessed end pieces E E$^1$, the cross-bar G, spring H, and stirrups I I, substantially as and for the purpose set forth.

In testimony whereof we have signed our names to this specification in the presence of two subscribing witnesses.

MELVILLE E. SMILIE.
WM. COOLEY.

Witnesses:
J. S. BATCHELDER,
DANIEL LADD.